Figure 3:
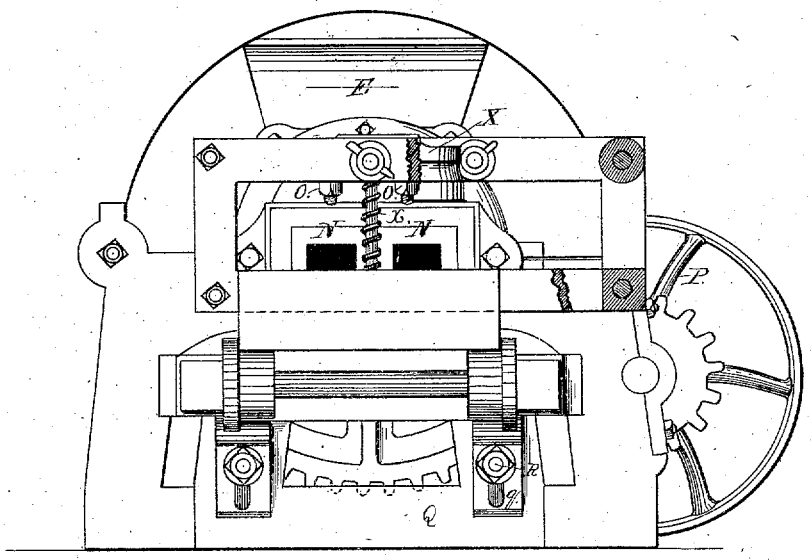

3 Sheets—Sheet 1.
P. H. KELLS.
Brick Machine.
No. 8,127. Reissued March 19, 1878.
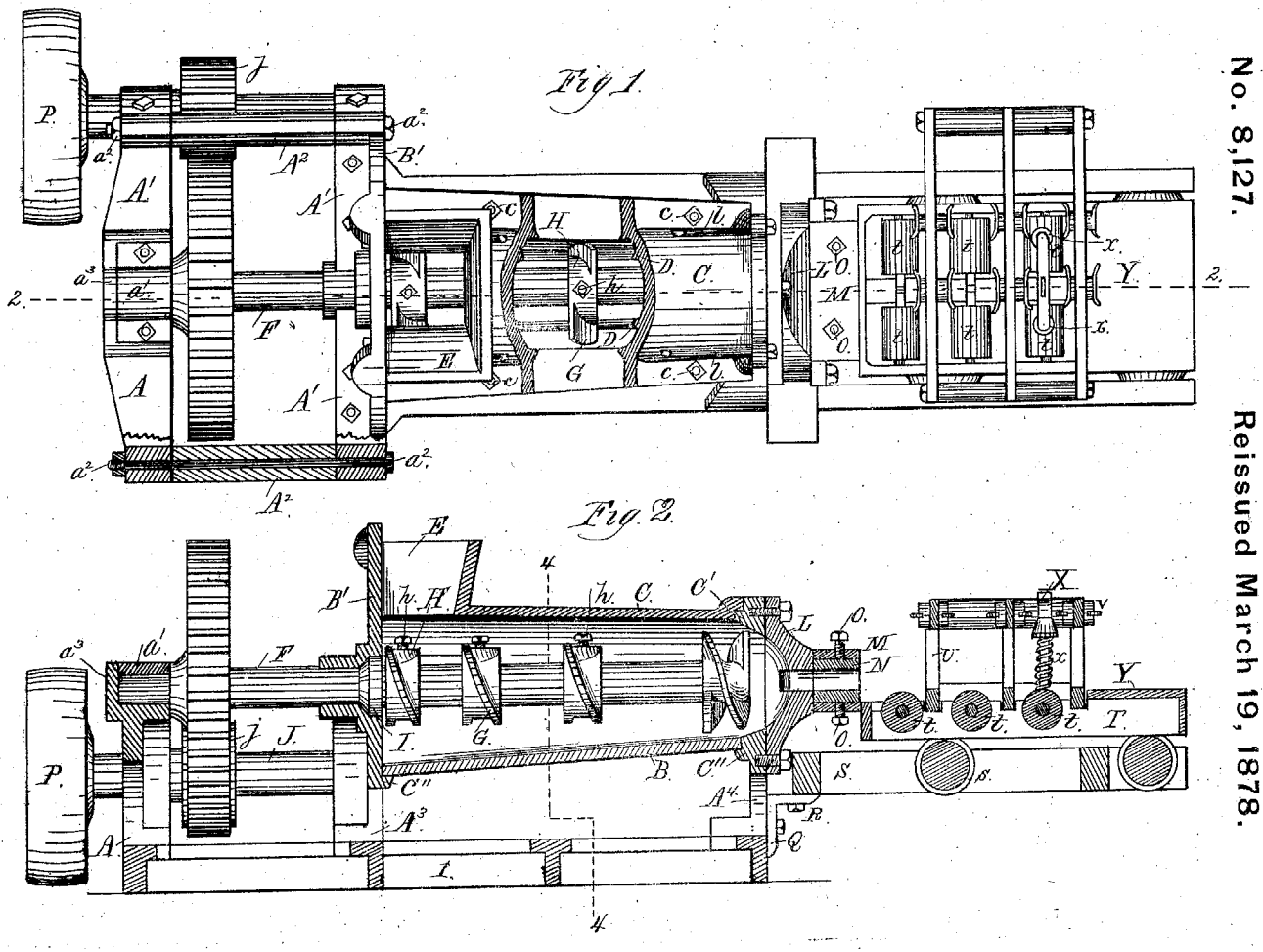
Attest:
Geo. T. Smallwood Jr.
Walter Allen
Inventor:
Philip H. Kells.
By Knight Bros
Atty's.

3 Sheets—Sheet 2.

P. H. KELLS.

Brick Machine.

No. 8,127. Reissued March 19, 1878.

Attest

Geo. T. Smallwood Jr.

Walter Allen

Inventor:

Philip H. Kells.

By Knight Bros

Atty's.

P. H. KELLS.

Brick Machine.

No. 8,127. Reissued March 19, 1878.

Attest:
Geo. T. Smallwood Jr.
Walter Allen

Inventor:
Philip H. Kells.
By Knight Bros
Attys.

UNITED STATES PATENT OFFICE.

PHILIP H. KELLS, OF ADRIAN, MICHIGAN.

IMPROVEMENT IN BRICK-MACHINES.

Specification forming part of Letters Patent No. 177,851, dated May 23, 1876; Reissue No. 8,127, dated March 19, 1878; application filed February 18, 1878.

*To all whom it may concern:*

Be it known that I, PHILIP H. KELLS, of Adrian, in the county of Lenawee and State of Michigan, have invented certain new and useful Improvements in Brick and Tile Machines, of which the following is a specification:

My improvements consist, first, in two supports for the main or grinding shaft, secured together by means of bolts passing through girts extending longitudinally from one support to the other.

My improvements consist, further, in securing a front support rigidly to the rear supports by means of longitudinal bolts, thus forming a substantial frame for the operating mechanism, main shaft, and casing, said frame being tied together from end to end.

My improvements consist, further, in constructing the rear and front supports with ledges on their insides.

My improvements consist, further, in providing the frame with removable girts, bolts, cap-plates, and casing-cap, to facilitate the removal of the shaft and master-wheel, so that they may be rolled out horizontally without the labor of elevating such a heavy weight.

My improvements consist, further, in constructing the rear support, whose upper portion forms the rear end of the casing, in two parts, chambered to receive a collar on the shaft.

My improvements consist, further, in a roller-frame supported adjustably by means of brackets, and adapted to receive the clay as it is delivered in continuous lengths from the dies, which are removable and changeable, to produce brick or tile columns of different sizes or sections.

My improvements consist, further, in a supporting-frame provided with rollers, adapted to receive a roller-frame capable of a reciprocating longitudinal motion, and adjustable in height to correspond with the dies.

My improvements consist, further, in a delivery-nozzle or nose-piece, within which are dies delivering the clay to parallel independent sets of cylindrical carrying-rollers, receiving the columns of clay advancing independently of each other.

My improvements consist, further, in a longitudinal carrying-frame, with which I combine a transverse cutting-frame and a clamp for holding the clay while being cut to form the bricks.

My improvements consist, further, in providing the cutting-frame with vertical wires for dividing the clay, keys for tightening the wires, and jam-nuts for securing the keys.

My improvements consist, further, in elastic forming-dies whose sides are capable of being pressed inward by set-screws, which also hold the dies in position.

Figure 4:
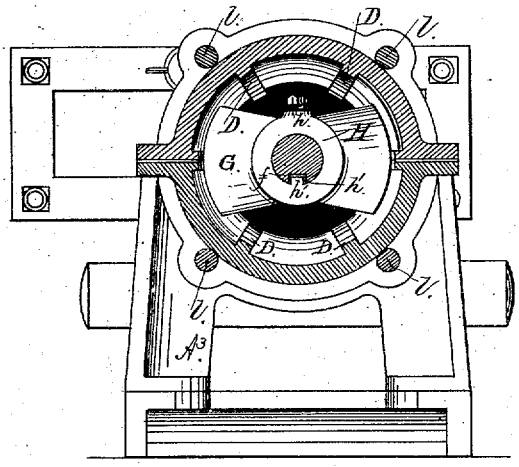
Figure 5:
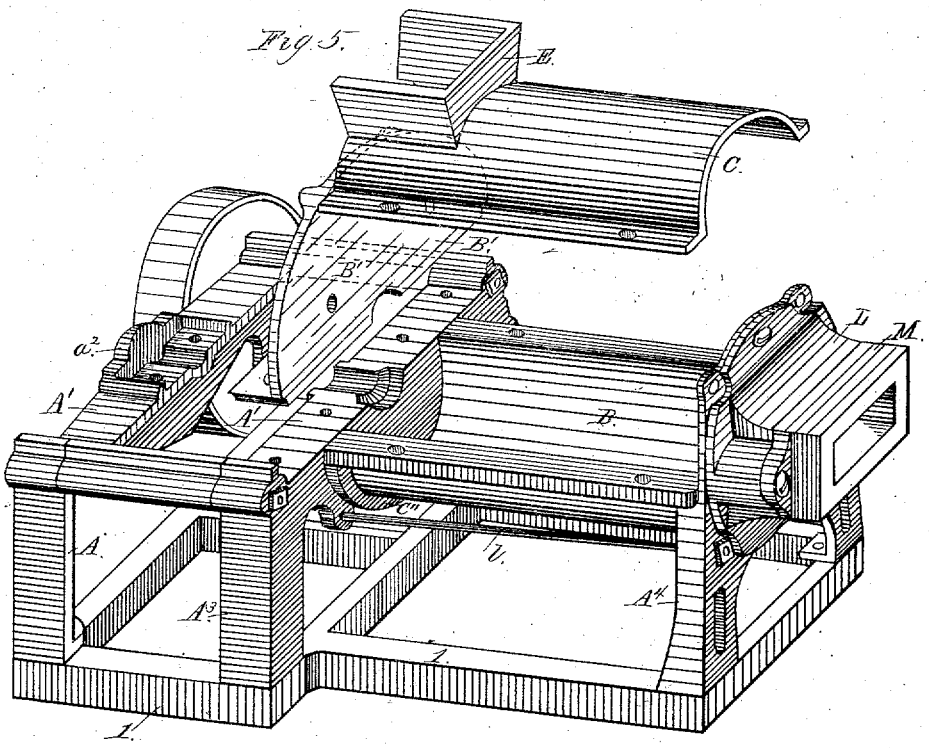
Figure 6:
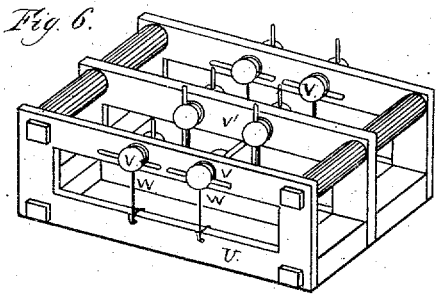

In the accompanying drawings, Figure 1 is a plan of the machine, partly in section. Fig. 2 is a vertical longitudinal section on the line 2 2, Fig. 1. Fig. 3 is a rear elevation. Fig. 4 is a transverse section on the line 4 4, Fig. 2. Fig. 5 is a perspective view of the frame, the casing-cap and the cap-plates being detached and the shaft removed. Fig. 6 is a perspective view of the transversely-moving cutting-frame.

1 may represent the base or bed-plate of the machine, and A $A^3$ $A^4$ supports for the shaft and casing. The rear supports A $A^3$ are constructed with transverse beams $A^1$ $A^1$, having bearings for a main or driving shaft, F. The rearmost support A is also constructed with a shoulder, $a^3$, for receiving the end thrust of the shaft. The rear support $A^3$ is horizontally divided, and its upper portion B′ forms the rear end of the casing B. It is provided with a recess or chamber for a fixed collar, I, on the shaft F. Both supports A $A^3$ are tied together by bolts $a^2$ $a^2$, passing through hollow girts $A^2$ $A^2$. The main shaft F is confined to its bearings by a cap-plate, $a^1$, and the portion or cap-plate B′, and is constructed with a longitudinal groove, *f*, adapted to receive lugs *h′*, projecting inward from heads or collars H, carrying spiral blades G. These heads or collars are secured adjustably on the shaft by means of set-screws *h*.

The front support $A^4$ forms the front plate of the casing B, and is tied to the rear supports by means of long bolts *l l l l*, the casing B being held securely between the supports $A^3$ $A^4$, which are provided with ledges C″ C″ and C′ C′. The casing B is horizontally divided, forming two parts, the lower part being supported on the ledges C″ C″, and the upper part or cap C on the ledges C′ C′. These parts are secured together by bolts *c*. The interior of the casing is constructed with any necessary number of ribs D longitudinally thereof, to prevent the clay partaking of the rotary movement of the shaft. The casing tapers, as represented, from back to front, and the cap is provided at its receiving end with a hopper, E, through which the clay is introduced.

The shaft is driven, by any suitable motor, by means of a pulley, P, or other connection, on a shaft, J, carrying a pinion, *j*, which gears with the master-wheel on the main shaft F.

The longitudinal girts $A^2$ $A^2$, cap-plates $a^1$ B′, and casing-cap C, being removable, will admit of the master-wheel and shaft being unshipped horizontally, without lifting them bodily over the frame. The cap or upper half of the casing being detachable without displacing the end supports, the interior of the case is readily accessible. The delivery end of the casing is constructed with a cap, L, screwed or bolted to the front support $A^4$, which is connected to the rear support $A^3$ by bolts *l l*. The upper bolts *l l* are removed when the casing is to be opened.

M is a delivery-nozzle or nose-piece, within which are dies N N, arranged side by side, formed and adapted to cause the delivery of the clay in columns corresponding in section to the bricks to be produced. The dies N are changeable, so as to produce bricks of any size, and are held in position by set-screws O, which, bearing on the center part of the die, press it inward, so as to produce concavities at the centers of the bricks, and leave the corners permanent. Q Q are brackets secured to the front end of the frame by set-screws or clamps R, occupying slots *q* in the said brackets, so that the latter are adjustable in height. The brackets Q support a horizontal frame, S, in which are flanged rollers *s* for the support of the roller-frame T, which is free to move longitudinally, so that it may partake of the movement of the clay, while the latter is clamped upon it for the purpose of cutting the clay, as hereinafter described. The rollers *t t* in this reciprocating frame are at their upper parts on a level with the bottoms of the apertures in the dies N. The vertical adjustability of the frame S by means of the slotted brackets Q admits of setting it up or down to cause the rollers to correspond in position with the particular dies in use. U represents a transversely-reciprocating frame, constructed with three (more or less) sets of horizontal bars, between which are stretched vertical wires W. The upper end of each wire is wound on a key, V, to provide for the tightening of the wire, the key being securely held by a clamp-nut, V′, fitted on the screw-shaft of the key. X is a clamp, which is held up by a spring, *x*, and is employed, when pressed down on the columns of clay, to hold them against lateral motion while being cut. The severed clay is received on a table, Y, from which the sections are conveyed by hand, or in any preferred manner. By the use of sets of receiving-rollers *t*, one from each column of clay, each column is allowed to progress independently of the other, so that when, as it generally happens, one column advances faster than another, the surface of the pressed clay and the straightness and symmetry of the column are not marred by friction against the rollers. The clamp X is of great utility to hold the columns of clay against lateral movement when the clay is severed. Without this the clay is liable to be pressed over sidewise, and thus will not be cut straight across.

My construction of the thumb-keys for tightening the wires and jam-nuts or clamps for locking them is greatly superior to the common tightening-screws, which require the use of a wrench. By my device I am enabled to tighten the wires at any time when the machine is running. The set-screws O, acting on the centers of the dies N, not only enable the operator to make the surfaces of the column concave, but are useful for the purpose of preventing the center part of the column from running out too fast.

The machine is well adapted for manufacturing tiles, either open or tubular, a suitable core-die being employed to form the cavity or the bore, as the case may be, in the customary manner.

The machine tempers the clay for itself, and operates with perfect success on clay introduced in its crude state, as taken from the bank, sand being added, if desired.

Having thus described my invention, the following is what I claim as new therein and desire to secure by Letters Patent—

1. The main-shaft supports A $A^3$, secured together by bolts $a^2$ $a^2$, passing through girts $A^2$ $A^2$, in combination with a base, 1, as and for the purpose set forth.

2. The combination, with the supports A $A^3$, bolts $a^2$ $a^2$, girts $A^2$ $A^2$, and front support $A^4$, of the lower bolts *l l*, as and for the purpose set forth.

3. The combination of the support A, the support $A^3$, having removable upper portion B′, bolts $a^2$ $a^2$, girts $A^2$ $A^2$, front support $A^4$, and bolts *l l l l*, as and for the purpose set forth.

4. The rear and front casing-supports $A^3$ $A^4$, the front support $A^4$, constructed with a ledge, C′, for a removable cap, C, as and for the purpose set forth.

5. The combination of rear support $A^3$, having ledge C″, the front support $A^4$, having ledges C′ C″, and the horizontally-divided cylinder or casing B C, supported by said ledges, as and for the purpose set forth.

6. The horizontally-divided casing B C, the end supports $A^3$ $A^4$, having ledges C′ C″ C″, and suitable bolts *l l*, as shown and described.

7. The removable girts $A^2$, bolts $a^2$, cap-plates $a^1$ B′, and casing-cap C, constructed and applied substantially as described, to facilitate the removal of the shaft and master-wheel.

8. The two-part support and back plate $A^3$ B′, in combination with the shaft F and collar I, the latter fitting within a chamber in the support.

9. The carrying-frame, adjustable on the front leg, as shown and described.

10. The combination of the frame S, supported adjustably by means of brackets Q, with rollers to carry the columns of clay, and dies N, removable and changeable, to produce brick or tile columns of different sizes or sections, as explained.

11. The combination of the supporting-frame S, having rollers *s s*, and the longitudinally-sliding roller-frame T, as and for the purposes set forth.

12. The combination of the nose-piece M, the dies N N, and the roller-frame T, provided with parallel independent sets of cylindrical carrying-rollers *t t*, receiving the columns of clay advancing independently of each other, all constructed and operating as and for the purposes set forth.

13. The combination of the longitudinal carrying-frame T, the transverse cutting-frame U, and the clamp X, for holding the clay while being cut, as explained.

14. The combination, in the cutting-frame U, of the vertical wires W, horizontal keys V, and jam-nuts V′, as and for the purposes set forth.

15. The combination of the elastic forming-dies N and set-screws O O, bearing on the upper and under sides of said dies, to compress and contract their central parts, as explained.

16. The combination of the tapering horizontal casing B C, longitudinally-grooved shaft F, oblique knives G G, heads H, lugs *h* and screws *h′*, nose-piece M, and the delivery-dies N N, all constructed and arranged to operate as and for the purpose set forth.

PHILIP H. KELLS.

Witnesses:
WILLARD STEARNS,
J. W. HELME, Jr.